United States Patent [19]

Struven

[11] Patent Number: 4,476,574
[45] Date of Patent: Oct. 9, 1984

[54] RADIO FREQUENCY COMMUNICATION SYSTEM UTILIZING RADIATING TRANSMISSION LINES

[75] Inventor: Warren C. Struven, San Carlos, Calif.

[73] Assignee: The United States of America as represented by the United States Department of Energy, Washington, D.C.

[21] Appl. No.: 410,785

[22] Filed: Aug. 23, 1982

Related U.S. Application Data

[63] Continuation of Ser. No. 187,914, Sep. 17, 1980, abandoned.

[51] Int. Cl.³ .......................... H04B 1/00; H04B 7/00
[52] U.S. Cl. ....................................... 455/55; 455/14; 455/41
[58] Field of Search ....................... 455/11, 14, 41, 55, 455/286; 179/82

[56] References Cited

U.S. PATENT DOCUMENTS

| | | | |
|---|---|---|---|
| 2,779,924 | 1/1957 | Chatellier | 455/286 |
| 3,829,767 | 8/1974 | Delogne | 455/55 |
| 3,916,311 | 10/1975 | Martin | 455/55 |
| 4,152,648 | 5/1979 | Delogne | 455/55 |
| 4,280,225 | 7/1981 | Willis | 455/55 |

OTHER PUBLICATIONS

"The Use of In-Line Repeaters in Leeky Feeder Radio Systems for Coal Mines", by David J. R. Martin, 1978.
"Systems Aspects of Leakage-Field Radio Communication" by D. J. R. Martin, Nov. 1975.
"The Bicoaxial Leaky Line and its Application to Underground Radio Communications", by D. J. R. Martin, 1976.
"A General Study of the Leaky-Feeder Principle" by D. J. R. Martin, 1975.
"Radio Communication in Mines" by D. J. R. Martin, 1978.
"Leaky Feeder Radio Techniques for Mines and Tunnels" by D. J. R. Martin et al., 1979.
"Guided Radiation-The Key to Tunnel Talking" by R. A. Farmer et al., 1965.
"Developments in Leaky Feeder Radio Communication" by Q. V. Davis et al., 1977.
"Radio Communication in Subways and Mines Through Repeaters, Amplifiers & Leaky Transmission Lines" by Isberg, 1978.
"Radio Links for Highway Tunnels" by A. Bosshard, May 1979.
"Guided Radio Communication in Tunnels, Mines, Canyons and Buildings" by Isberg, 5/1979.
"Data Communication from a Vehicle Using a Leaky Feeder" by Davis et al., 1977.
"The Planned National Highway System for Switzerland" by Grossi, 7/1978.
"Subsurface Radio Communications" by Delogne, 1980.
"Some Aspects of Leeky Feeder Radio Communication Being Studied by the UK National Coal Board" by Martin, Mar. 1978.

*Primary Examiner*—Jin F. Ng
*Attorney, Agent, or Firm*—Clifton E. Clouse, Jr.; Roger S. Gaither; Michael F. Esposito

[57] ABSTRACT

A radio communication system for use in tunnels, mines, buildings or other shielded locations in which a pair of radiating transmission lines (30), (31) extend through such location in spaced coextensive relation to each other. Each transmission line (30), (31) has at least one unidirectional amplifier (32), (33) interposed therein with the sense of the unidirectional amplifier (32) of one transmission line (30) being opposite to the sense of the unidirectional amplifier (33) of the other transmission line (31). Each of the amplifiers (32), (33) has a gain which is less than the coupling loss between the transmission lines (30), (31). Two or more mobile transceivers (35) in the location served by the system are coupled to the transmission lines (30), (31) by electromagnetic wave propagation in space in order to communicate directly with each other at a given radio frequency within the frequency range of the system.

25 Claims, 10 Drawing Figures

FIG_1A (PRIOR ART)
FIG_1B (PRIOR ART)
FIG_1C (PRIOR ART)
FIG_2

FIG_7

FIG_8

RADIO FREQUENCY COMMUNICATION SYSTEM UTILIZING RADIATING TRANSMISSION LINES

The United States Government has rights in this invention pursuant to Contract No. DE-AC03-76SF00515 between the United States Department of Energy and Stanford University.

This is a continuation of application Ser. No. 187,914, filed Sept. 17, 1980, now abandoned.

BACKGROUND OF THE INVENTION

This invention relates generally to radio communication utilizing radiating transmission lines and more particularly to an improved method and apparatus for utilizing radiating transmission lines to provide multiple channels of mobile-to-mobile radio communication in tunnels, mines, building and other confined spaces.

The near impossibility of wireless communication by conventional broadcast radio techniques in tunnels, mines and buildings has been known from the beginning of radio communication. Due to well-known physical principles, an electromagnetic wave will not propagate for any appreciable distance in a confined space having lossy, discontinuous or irregular boundaries. For example, it is not only impossible to broadcast a radio frequency signal for more than a limited distance into a mine or tunnel from an outside point but it is also impossible for two mobile radio transceivers both located in a mine or tunnel to communicate with each other for more than a limited distance. Similarly, buildings constructed of steel and concrete define spaces in and into which conventional radio communication is difficult and unreliable. Even natural or man-made hills and valleys in the surface of the earth define areas which present difficulties in communicating by conventional broadcast or mobile radio techniques.

An early attempt to approach the advantages of radio communication in tunnels, mines and buildings was based on low frequency inductive coupling between mobile transceivers and a conductive wire extending throughout the space to be served. A low frequency electrical signal can be transmitted for a great distance along a conductive wire before resistive and inductive effects attenuate it to a value too low to be useful, whereas a high frequency signal will be attenuated in a relatively short distance, as is well known in the telephone art. This difference is largely due to the fact that high frequency energy will be radiated from the wire to a far greater extent than low frequency energy. Thus, at low frequencies, very close physical proximity is required between the conductive line and the transceivers to provide reliable inductive coupling of signals therebetween. The requirement for close physical proximity between the line and the transceiver makes the low frequency inductive coupling approach substantially equivalent to direct wire connections of the telephone type between mobile units with all of the disadvantages thereof.

Another approach has been to provide a plurality of fixed transceivers distributed throughout the tunnel, mine or other area to be served with their antennas radiating to adjacent limited areas and with all of the fixed transceivers interconnected by telephone lines. With proper control circuitry this system can provide satisfactory coupling to and from mobile transceivers. A radio signal from a first mobile transceiver will activate the receiver of the fixed transceiver covering the area in which the first mobile transceiver is located and the demodulated audio signal produced by such receiver will be transmitted over the telephone lines to activate the transmitters of the other fixed transceivers. Thus, the radio frequency signal from the transmitter of the other fixed transceiver will reach a second mobile transceiver in the tunnel and two-way communication can be established according to conventional radio techniques.

However, it is impossible to provide complete coverage of the mine, tunnel or other space without overlapping of the coverage of one or more of the fixed transceivers. If the coverage is not complete, then there will be dead areas that cannot be reached by radio signals and from which no radio signals can be received. If there is overlapping coverage by two or more fixed transceivers, then radio signals in the overlapping areas will interfere with each other in their effect on the control system and will make communication unreliable to and from the area in which overlapping coverage is present.

In the United States, improved coverage with reduced overlapping has been obtained in the above described system of fixed transceivers interconnected by telephone lines through the substitution of radiating transmission lines for the antennas of the transceivers. Thus, the antenna connections of each transceiver have been connected to the midpoint of a length of conventional high frequency balanced twin lead transmission line, for example. Radio frequency energy will propagate along such a transmission line for a greater distance than along a single wire conductor since radio frequency energy will be radiated from the balanced transmission line more evenly along the length thereof. Thus, the transmission line will act as a distributed antenna allowing each fixed transceiver to cover a greater area with a relatively constant antenna coupling compared to the substantially point coupling characteristics of a conventional antenna. There will still be a problem of overlapping coverage or dead spots at the ends of adjacent transmission lines, however, a smaller number of fixed transceivers will be required to cover a given mine, tunnel or other area resulting in a smaller number of areas in which overlapping coverage or dead spots may occur. The number of transceivers required has been further reduced through the use of balanced transmission lines providing less radio frequency attenuation along their length while still allowing adequate distributed coupling of radio frequency thereto and therefrom. For example, coaxial cable having a braided outer conductor that is loosely braided to allow the desired distributed coupling has been used in the United States.

However, a network of fixed transceivers interconnected by telephone lines as described above can only provide a single channel of communication. In order to add each additional channel of communication, an additional network of relatively expensive transceivers operating at a sufficiently different frequency to avoid interference and with the requirement for power, transmission lines, control and telephone line interconnection is required.

In Europe and particularly in England, it has been thought necessary to abandon conventional radio communication techniques in seeking to provide wireless mobile-to-mobile communication in mines, tunnels and buildings. See "Systems Aspects of Leakage-Field Radio Communications" by D. J. R. Martin et al., Civil Land Mobile Conference, IEEE Conference Proceedings, November 1975.

Instead, systems have been developed in England as an entirely new technology based on the use of coaxial transmission lines modified as believed appropriate to provide coupling thereto and therefrom to synthesize the propagation of electromagnetic energy along and within the mine, tunnel, or other space. U.S. Pat. No. 3,916,311 issued to D. J. R. Martin et al., Oct. 28, 1975, is representative of the basic system according to this approach and will be more fully discussed hereinafter together with more sophisticated versions thereof. According to this new technology, specially designed and expensive coaxial transmission lines are required. In addition, two different frequencies, as well as a base station, are required to provide each channel of mobile-to-mobile communication in the mine or tunnel with the consequent need for specialized and expensive filters for equalization and complicated control circuitry as well as the different mobile transceivers for each channel of mobile-to-mobile communication.

SUMMARY OF THE INVENTION

It is an object of this invention to provide substantially normal mobile-to-mobile radio communication in tunnels, mines, buildings and similar confined areas using conventional radio techniques and commercially available radio components.

It is another object of this invention to provide multiple channels of substantially normal radio communication in tunnels, mines, buildings and similar confined areas without adding to the duplication of components required for multiple channels in normal radio communication.

It is a further object of this invention to provide a simple and inexpensive method and means for multiple channel mobile-to-mobile and base-to-mobile radio communication in tunnels, mines, buildings and similar confined areas.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the radio communication system of this invention comprises a first radiating transmission line having a proximate end and a distal end with a unidirectional amplifier therein for amplifying a radio frequency signal from the proximate end to the distal end thereof and a second radiating transmission line spaced from and extending substantially coextensive with the first transmission line having a proximate end and a distal end with a unidirectional amplifier therein for amplifying a radio frequency signal from the distal end to the proximate end thereof. A radio frequency transmitter is coupled to at least one of the first and second transmission lines and a radio frequency receiver is coupled to at least the other of the first and second transmission lines. The unidirectional amplifiers of the first and second transmission lines each have a gain less than the coupling loss between the first and second transmission lines.

Preferably, the first and second transmission lines each include a plurality of unidirectional amplifiers spaced therealong with the gain of each such unidirectional amplifier being substantially equal to the attenuation loss of the portion of the transmission line between it and the amplifier preceding it in such transmission line. It is also preferred that the transmitter and receiver operate at the same radio frequency. In one preferred embodiment of this invention, the radio frequency transmitter is coupled to the proximate end of the first transmission line, the radio frequency receiver is coupled to the proximate end of the second transmission line and a mobile transceiver operating at the same radio frequency as the transmitter and receiver is coupled to both transmission lines by electromagnetic wave propagation in space intermediate the proximate and distal ends thereof.

In another preferred embodiment of this invention, the transmitter and receiver comprise a transceiver coupled to the first and second transmission lines by electromagnetic wave propagation in space intermediate the proximate and distal ends thereof and a second transceiver operating at the same radio frequency as the transmitter and receiver is coupled to the first and second transmission lines by electromagnetic wave propagation in space intermediate the proximate and distal ends thereof.

The unidirectional amplifiers of the first and second transmission lines are preferably broad band amplifiers so that a plurality of channels of radio communication may be provided by the system.

The radio communication system according to this invention may be fabricated using commercially available components without modification. Multiple channels of communication may be provided without duplication of the first and second transmission lines thus providing multiple channels of radio communication without increased cost. The communication system of this invention is inexpensive and easy to install while providing reliable mobile-to-mobile radio communication using conventional radio techniques and apparatus.

BRIEF DESCRIPTION OF THE DRAWING

This invention will be more fully understood from the following description of the prior art and preferred embodiments of this invention when read in conjunction with the accompanying drawings which are incorporated in and form a part of the specification and wherein.

DETAILED DESCRIPTION OF PRIOR ART

Figures 1A, 1B:
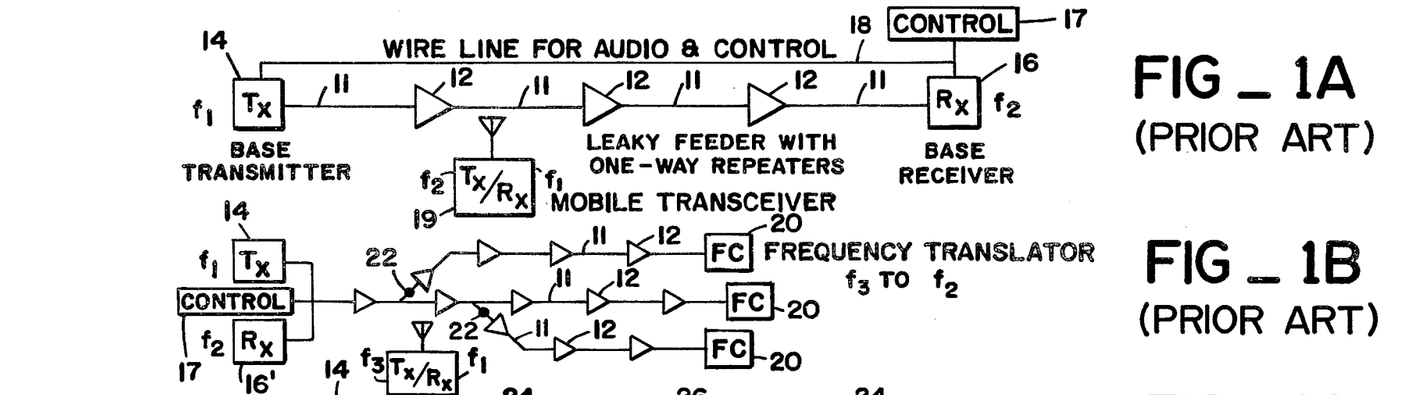
FIG. 1A is a block diagram of a radio communication system known in the prior art as the "daisy-chain system".
FIG. 1B is a block diagram showing a modification of the daisy-chain system known in the prior art.

Referring to FIG. 1A, a radio communication system known in the prior art referred to hereinabove and widely used in Europe is shown in block diagram form. According to such system, a radiating transmission line 11 or "leaky feeder" having unidirectional amplifiers 12 or "one-way repeaters" periodically interposed therein is strung along the length of the mine or tunnel. A base transmitter 14 operating at a first radio frequency F1 is connected to one end of the transmission line 11 and a base receiver 16 operating at a second radio frequency F2 is connected to the other end of the transmission line with the amplifiers 12 being adapted to amplify the signal of the base transmitter as it passes along the transmission line from the base transmitter toward the base receiver. It should be noted that there is no radio frequency coupling between the transmitter 14 and the receiver 16 since they operate at different radio frequencies. Instead, the transmitter 14 and receiver 16 are interconnected with each other and with the control room by means of a conventional wire line 18 of the telephone type. Thus, audio signals generated in the control room may be transmitted by the wire line 18 to the transmitter 14 in order to modulate the radio frequency generated by the transmitter 14 for transmission along the transmission line 11. Similarly, if the receiver 16 receives a radio frequency signal at frequency F2 modulated with an audio signal, the audio signal will be coupled to the control room. It will be understood that the unidirectional amplifiers are capable of amplifying a band of frequencies broad enough to include both the frequency F1 of the transmitter 14 and the frequency F2 of the receiver 16. Thus, a mobile transceiver 19 in the mine or tunnel adapted to transmit at the frequency F2 and receive at the frequency F1 can communicate with the control room 17. Furthermore, a first mobile transceiver 19 located within the mine or tunnel can communicate with a second mobile transceiver 19 located in the mine or tunnel. A signal transmitted by the first mobile transceiver 19 at frequency F2 would not be received directly by the second mobile transceiver. Instead, such signal would be received by the receiver 16 and the audio modulation thereof would be directed by the control room back to the transmitter 14 for modulation on the frequency F1 and retransmission along the transmission line 11 for coupling to the second mobile transceiver. It will be understood that signals to and from the mobile transceivers 19 are coupled to the transmission line 11 by means of radio frequency waves propagated in space and thus close physical proximity between the antennas of the mobile transceivers 19 and the transmission line 11 is not required.

The "daisy-chain system" as described above is believed to have advantages over the radio communication systems heretofore used in mines and tunnels in the United States in that relatively inexpensive amplifiers 12 are substituted for the fixed transceivers and complicated synchronizing control interconnections thereof. The basic approach in the daisy-chain system is to reduce the attenuation present in the transmission line 11 toward the minimum required to provide the desired radiation within the tunnel thereby reducing the number of amplifiers 12 which are required. To this end it is common in Europe to use a radiating transmission line in the form of a coaxial cable having appropriate openings in its outer shield to provide carefully controlled radiation. In such a system the power required to operate the amplifiers 12 may be conveniently transmitted along the transmission line together with the radio frequency signals in the form of low frequency or DC power.

The above described daisy-chain system has a number of disadvantages. In the first place, two different frequencies are required for each channel of communication. In addition, a transmitter and a receiver at opposite ends of the transmission line together with an appropriate wire line and control interconnecting them is required for each additional channel of communication. Thus, if any number of channels of communication are to be provided, the amplifiers 12 must have a bandwidth broad enough to cover a large number of frequencies and sophisticated telephone interconnections are required in order to keep the cost down and avoid interference between the communication channels. In addition, although the daisy-chain system of FIG. 1 is suitable for use in tunnels, it is difficult to apply in mines having branches off the main shaft that are to be covered by the communication system.

FIG. 1B is a block diagram of a modification of the daisy-chain system which provides certain advantages. The system shown in FIG. 1B utilizes a third operating frequency in order to avoid the need for a wire line interconnection between a transmitter and a receiver at opposite ends of the system. In addition, the system shown in FIG. 1B simplifies the provision of spurs to cover branching shafts in a mine, for example. The same transmission line 11 and amplifiers 12 as used in the daisy-chain system of FIG. 1A may be used in the modification of FIG. 1B. However, according to the modification of FIG. 1B, a transmitter and receiver are both located at the same end of the transmission line together with an appropriate control circuit interconnecting them. In the modification of FIG. 1B, the transmitter operates at a radio frequency on the order of 80 MHz whereas the receiver operates at a relatively low frequency on the order of 455 kHz. At the opposite end of the transmission line and at the end of each branch thereof a frequency translator 20 is provided similar to the intermediate frequency generator in conventional heterodyne type radio receivers. Mobile transceivers 21 for use in the mine, according to the modification of FIG. 1B are adapted to receive at the frequency F1 of the transmitter 14 and to transmit at a different radio frequency F3 of the order of 72 MHz for example. Thus, signals from the transmitter 14 are transmitted down the transmission line 11 and are amplified as necessary by amplifiers 12 to compensate for attenuation of such signal. Similarly, signals at frequency F3 transmitted by the mobile transceiver 21 are transmitted down the transmission line 11 to the appropriate frequency translator 20 where they are converted to the low frequency F2 at which the receiver 16' operates. Such signals can be transmitted backward through the transmission line 11 with relatively little attenuation due to their low frequency and the amplifiers 12 may be adapted to pass such low frequency signals in a reverse direction. Thus, the low or intermediate frequency F2 will be received at the receiver 16' and demodulated to provide an audio signal which may then be used to modulate the radio frequency output of the transmitter 14 in order to reach a second mobile transceiver in the mine. Again, power for the amplifiers 12 may be provided through the coaxial transmission line 11. It is necessary to provide appropriate filters 22 at the root of any branches in the system, which filters 22 must be capable of blocking radio frequency signals F3 transmitted by the mobile transmitters 20 but passing radio frequency signals F1 and intermediate frequency signals F2.

Again it will be necessary to provide an additional frequency translator at the end of each branch of the system as well as an additional transmitter and receiver for each additional channel of communication in the mine. Since three frequencies are required for each channel of communication, the design of the system in order to avoid cross-talk between such channels of communication will be complicated and relatively expensive components will be required.

Figures 1C, 2:
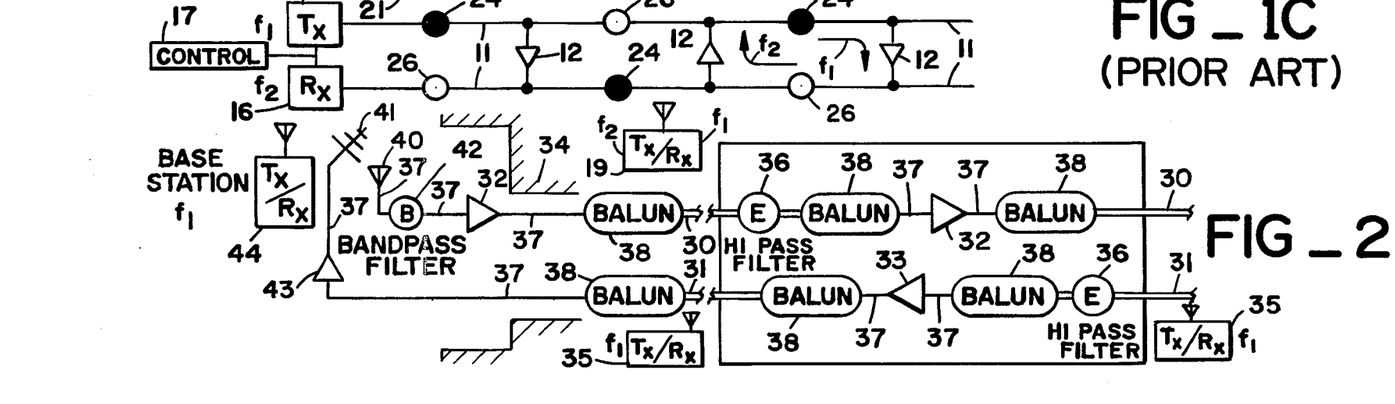
FIG. 1C is a block diagram showing an improvement on the daisy-chain system known in the prior art.
FIG. 2 is an enlarged block diagram of a preferred embodiment of the radio communication system according to the teaching of this invention.

Referring to FIG. 1C, an improvement in the daisy-chain system of communication is shown which enables the transmitter 14 and receiver 16 to be physically located at the same end of the transmission line without the requirement for a third or intermediate frequency and a frequency translator at the opposite end of the line. According to this improvement, a pair of transmission lines 11 are used and the amplifiers 12 are connected across such transmission lines in opposition to each other. The transmitter 14 operating at a first radio frequency F1 is connected to the end of the first transmission line and the receiver 16 operating at a second radio frequency F2 is connected to the same end of the other transmission line. A plurality of filters 24 capable of passing radio frequency F1 while blocking radio frequency F2 are interposed in the transmission lines 11 in staggered array between the amplifiers 12 as shown in FIG. 1C. Similarly, a plurality of filters 26 capable of passing radio frequency F2 while blocking radio frequency F1 are interposed between the amplifiers 12 and the transmission lines 11 in opposite array to the filters 24 as shown in FIG. 1C. Thus a radio frequency signal transmitted by the transmitter 14 at frequency F1 will alternate between sections of the transmission lines 11 passing through each of the amplifiers 12 in traveling from the transmitter 14 to the distal end of the transmission lines 11. A radio frequency signal at frequency F2 will pass from the distal end of the transmission lines to the receiver 16 passing through each of the amplifiers 12 to alternate between the lines 11, the paths of the radio frequency signals F1 and F2 being indicated by the arrows in FIG. 1C. As described in connection with FIG. 1A, a mobile transceiver 19 capable of receiving at frequency F1 and transmitting at frequency F2 located in the mine, can communicate with the control room which is connected to the receiver 16. Similarly, a first mobile transceiver 19 can communicate with a second mobile transceiver 19 since the audio signal from the receiver 16 may be used to modulate the radio frequency signal F1 of the transmitter 14 for retransmission along the system. However, two operating frequencies are required as well as expensive and sensitive filters 24 and 26 for reliable communication.

As pointed out hereinabove, the design of the radio communication systems of FIGS. 1A, 1B and 1C are all based on the premise that radio communication in mines and tunnels must be treated as an entirely new technology and that conventional radio communication techniques cannot be used. The result is that the systems are expensive and complicated and require the use of specially designed components. Furthermore, at least two frequencies are required for each channel of communication thereby multiplying cross-talk and intermodulation problems. All of such utilize specially designed coaxial cables to provide the radiating transmission lines 11 in order to reduce the number of components required in the system by reducing the attenuation in the transmission line toward the minimum required for coupling to mobile transceivers. The gain of the amplifiers 12 is kept as high as possible in order to minimize the number of amplifiers required, further complicating cross-talk and intermodulation problems. The use of inexpensive two conductor balanced transmission lines has been abandoned because of its relatively high attenuation, as well as to the fact that it is highly susceptible to excessive attenuation due to the presence of moisture or other contaminants inherently present in mine and tunnel environments.

Detailed Description of the Invention

Referring to FIG. 2, an enlarged block diagram of a preferred embodiment of the radio communication system according to this invention is shown. This invention is based on the discovery that the coupling loss between a pair of balanced twin lead transmission lines extending substantially parallel to each other and at a distance from each other on the order of a few feet over a practical length of a mine or tunnel, for example, is greater than the attenuation of such length of balanced twin lead transmission line. This discovery means that it is possible to build a stable system of indefinite length comprising a pair of balanced twin lead transmission lines with amplifiers interposed therein having a gain which is less than the coupling loss between the transmission lines in order to insure stability of the system and yet high enough to overcome the attenuation of an economically practical length of the balanced twin lead transmission line at radio communication frequencies of the order of 160 MHz.

Referring to FIG. 2, a first balanced twin lead transmission line 30 having a unidirectional amplifier 32 interposed therein and a second balanced twin lead transmission line 31 having a unidirectional amplifier 33 interposed therein, are shown in block diagram form. The transmission lines 30 and 31 extend along a tunnel or mine 34, for example, in close spaced relation of the order of a few feet. The unidirectional amplifiers 32 and 33 are interposed in their respective transmission lines 30 and 31 in opposite sense to each other. Thus a radio frequency signal on the transmission line 30 will be amplified and propagated in one direction and a radio frequency signal on the transmission line 31 will be amplified and propagated in the opposite direction.

In an actual installation of a radio communication system in accordance with this invention the coupling loss between the transmission lines 30 and 31 was found to be of the order of 45 dB. In such installation, a plurality of amplifiers 32 having a gain of 33 dB were interposed in the transmission lines 30 at spacings of about 800 feet from each other and a similar plurality of amplifiers 33 were interposed in the transmission line 31 at such spacing from each other. The resulting system was found to be stable, thus enabling a pair of conventional single frequency transceivers 35 to communicate with each other by conventional radio techniques over an indefinite distance in the tunnel 34. The balanced transmission line used was ordinary commercially available TV twin lead and since attenuation of the twin lead increases with frequency it was found necessary to interpose an inexpensive commercially available hi-pass TV filter at the input to each amplifier 32, 33 so that the radio frequency signals below about 50 MHz which may be coupled to the transmission lines 30 and 31 will not overdrive the amplifiers 32, 33.

In order to avoid any unnecessary attenuation of the radio frequency signals in the transmission lines 30 and 31, coaxial transmission line sections 37 may be interposed therein wherever radiation of the radio frequency signal is unnecessary or undesirable. It is of course necessary to provide a suitable transition or balun 38 between the twin lead and the coaxial line sections of the transmission lines 30 and 31. In an actual installation of the radio communication system according to this invention, an inexpensive balun as will be more fully described in connection with FIGS. 3 and 4 was found to be adequate for operation of the system over a frequency range of 150 to 170 MHz.

In the actual installation of the radio communication system according to this invention the amplifiers 32 and 33 were each locally powered from power supply systems already present in the tunnel 34. However, dc power for the amplifiers 32 and 33 could be conveniently provided by a dc voltage differential between the transmission lines 30 and 31 as necessary and desirable. It would, of course, be necessary for both the high pass filters 36 and the amplifiers 32 and 33 to pass direct current, it being noted that the baluns 38 will provide a direct current interconnection between the two conductors of each twin lead.

As shown in FIG. 2, the radio communication system according to this invention may be adapted to provide communication between mobile transceivers 35 in the tunnel 34 and a remote point. To this end, an omnidirectional antenna 40 may be connected through a band pass filter 42, amplifier 32 and balun 38 to the transmission line 30 to provide an ingoing radio frequency signal in the tunnel 34. Similarly, the other transmission line 31 may be connected to a directional antenna 41 through an appropriate amplifier 43 to provide an outgoing radio frequency signal from the tunnel 34. It is important that antenna 41 be directional in order to avoid a reduction in the coupling loss between the transmission lines 30 and 31 which could destroy the stability of the system. Thus, a transceiver 44 at a base station remote from the tunnel 34 operating in a simplex mode at a frequency of 160 MHz, for example, can communicate with similar mobile transceivers 35 in the tunnel 34 in the same way that such transceivers 35 can communicate with each other over the system according to this invention.

In the actual installation of a radio communication system according to this invention, an operating frequency range of between 150 and 170 MHz was selected. The transmission lines 30 and 31 comprised 300 ohm twin lead commercially available under the designation Belden No. 8275, the amplifiers 32 and 33 were wide band amplifiers commercially available under the designation TRW CA 2800 series and the filters 36 were conventional inexpensive 300 ohm TV high pass filters commercially available from the R. L. Drake Company.

Wide band amplifiers of the TRW CA 2800 series have input and output impedances of 50 ohms thus requiring impedance matching to the 300 ohm twin lead. In the actual installation a coaxial balun 38 constructed as shown in FIG. 3 was used to transform the impedance of the coaxial line up to 200 ohms which resulted in a reasonable match to the 300 ohm twin lead.

Figures 3, 4, 5:
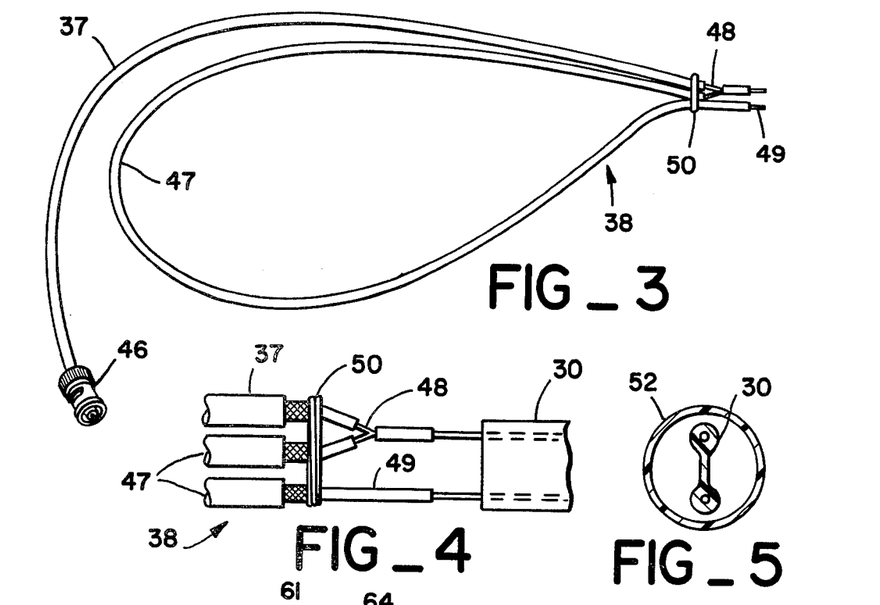
FIG. 3 is a perspective view of a balun suitable for use in the preferred embodiment of the communication system according to the teaching of this invention.
FIG. 4 is a fragmentary top plan view showing the interconnection between the balun of FIG. 3 and a twin lead transmission line suitable for use in the preferred embodiment of the radio communication system according to this invention.
FIG. 5 is a cross-sectional view of a twin lead transmission line suitable for use in the preferred embodiment of the radio communication system according to the teaching of this invention.

Referring to FIGS. 3 and 4, structural details of the balun 38 are shown. As shown in FIG. 3 the balun 38 comprises a loop 47 of coaxial line the center conductor of which is galvanically connected to the center conductor of the coaxial line 37 at the free end thereof. The other end of the coaxial line 37 is provided with a conventional coaxial coupling fixture 46 for connection to the amplifiers 32, 33. The free end 49 of the loop 47 is adapted to be galvanically connected to one conductor of the twin lead 30, 31 and the connected ends 48 of the loop 47 and coaxial line 37 are adapted to be connected to the other conductor of the twin lead 30, 31. A shorting bar 50 galvanically interconnects the outer conductor or shield of the coaxial line 37 to the outer conductor or shield of the coaxial loop 47 at both of its ends. The loop 47 has an effective length of substantially one-half wavelength at the midpoint of the operating frequency range of the system. Thus, the balun 38 may be easily and inexpensively fabricated from commercially available 50 ohm coaxial transmission line.

It should be noted that the twin lead type transmission line used in the radio communication system according to the teaching of this invention can be purchased at a cost of a few cents per foot. This cost should be compared to the cost of the leaky or radiating slotted coaxial cables used in communication systems of the prior art such as Andrew radiax cable available from the Andrew Corporation of Orland Park, Ill., at a cost of over two dollars per foot. Twin lead transmission line does have the disadvantage of being susceptible to excessive attenuation due to moisture and contaminants which settle thereon. However, referring to FIG. 5, such disadvantage may be avoided or minimized by threading the twin lead 30 through commercially available PVC pipe 52 for installation in the mine or tunnel. Suitable PVC pipe is commercially available at a cost of a few cents per linear foot and the twin lead may be conveniently blown or otherwise inserted through the pipe. The external surface of the pipe 52 may be periodically cleaned if necessary to avoid the build-up of excessive contaminants thereon.

Figure 6:
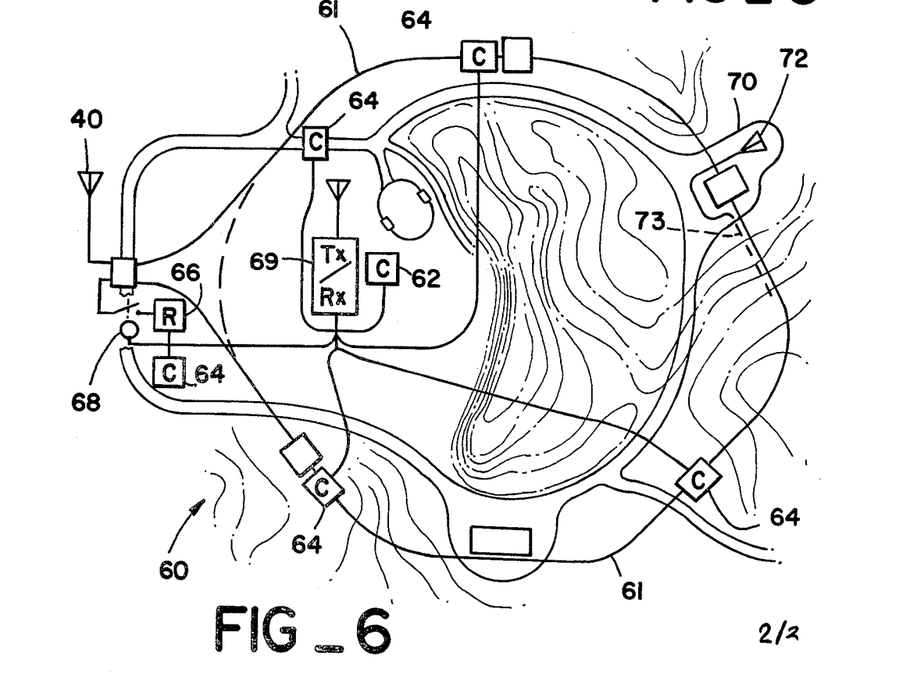
FIG. 6 is a map of the new 8,000 foot positron-electron storage ring at the Stanford Linear Accelerator Center with indications thereon of the installation of elements of the radio communication system according to the preferred embodiment of this invention.

Referring to FIG. 6, a generalized map of the site of the electron-positron storage ring 61 at the Stanford Linear Accelerator Center is shown. The storage ring is one of several experiments which use the two-mile linear accelerator as an injector and is installed in a tunnel approximately ten feet in diameter constructed of sprayed-on cement substantially entirely underground. Tests conducted when the storage ring tunnel was under construction established the fact that communication between mobile transceivers in the tunnel was only possible for a distance of approximately 100 feet whereas the tunnel has a total circumference of about 8000 feet. In addition, it was found to be impossible for a mobile transceiver within the tunnel to communicate with base or mobile transceivers located outside the tunnel. Thus a radio communication system according to this invention has been developed for installation in the tunnel of the positron-electron storage ring 61.

Referring to FIG. 6, it is necessary to provide communication from any point within the positron-electron storage ring tunnel 61 not only to a central control point 62, but also to a number of satellite control points 64 outside the tunnel and spaced about the periphery thereof. Thus, although an omnidirectional antenna 40 can be used to provide an ingoing signal as described in connection with FIG. 2, it was impractical to provide a directional antenna or antennas 41 for the outgoing signal, particularly in view of the fact that all of the control points 62, 64 are already interconnected by wire lines. Thus, the outgoing transmission line 31 is connected to the input of a receiver 66 through a switch 68. The output of the receiver 66 is connected to the existing wire lines which interconnect control points 62, 64. The switch 68 is also connected to the existing wire lines, it being understood that such wire lines provide audio communication between the control points 62, 64 and also enable the control points to operate the switch 68. As shown in FIG. 6, the existing wire lines are also connected to a base transceiver 69 to provide radio communication between any control point 62, 64 and any surface location in the positron-electron storage ring site 60.

The purpose of the switch 68 is to avoid interference on the wire lines interconnecting the control points 62, 64 due to simultaneous ingoing and outgoing signals in the storage ring tunnel 61. The switch 68 is normally closed but may be opened from any control point 62, 64 when it is desired to actuate the transmitter of the transceiver 69 in order to transmit a signal either into the storage ring tunnel 61 or elsewhere on the storage ring site 60. It is noted that the radio frequency systems currently used on the storage ring site are single frequency systems using conventional radio techniques. It will be seen that the radio communication system according to this invention is adapted for direct integration with such systems.

The site 60 of the electron-positron storage ring and tunnel 61 comprises hilly and uneven terrain. As indicated generally at 70 relatively deep valleys or depressions occur at various points in such site sometimes exposing a portion of the tunnel. Communication between a transceiver in such a valley or depression 70 and a transceiver 35 in the tunnel is unreliable and it is proposed that communication be provided in such isolated depressions or valleys by means of a passive antenna 72 coupled to the transmission lines 30 and 31 by means of an appropriate length of twin lead 73 mounted in the tunnel in appropriate proximity to the transmission lines 30 and 31. Alternatively, a branch or spur of the transmission lines 30 and 31 could be provided which would extend out of the tunnel and appropriately throughout the depression or valley 70 for coupling to a mobile transceiver located in such depression or valley 70.

Figures 7, 8:
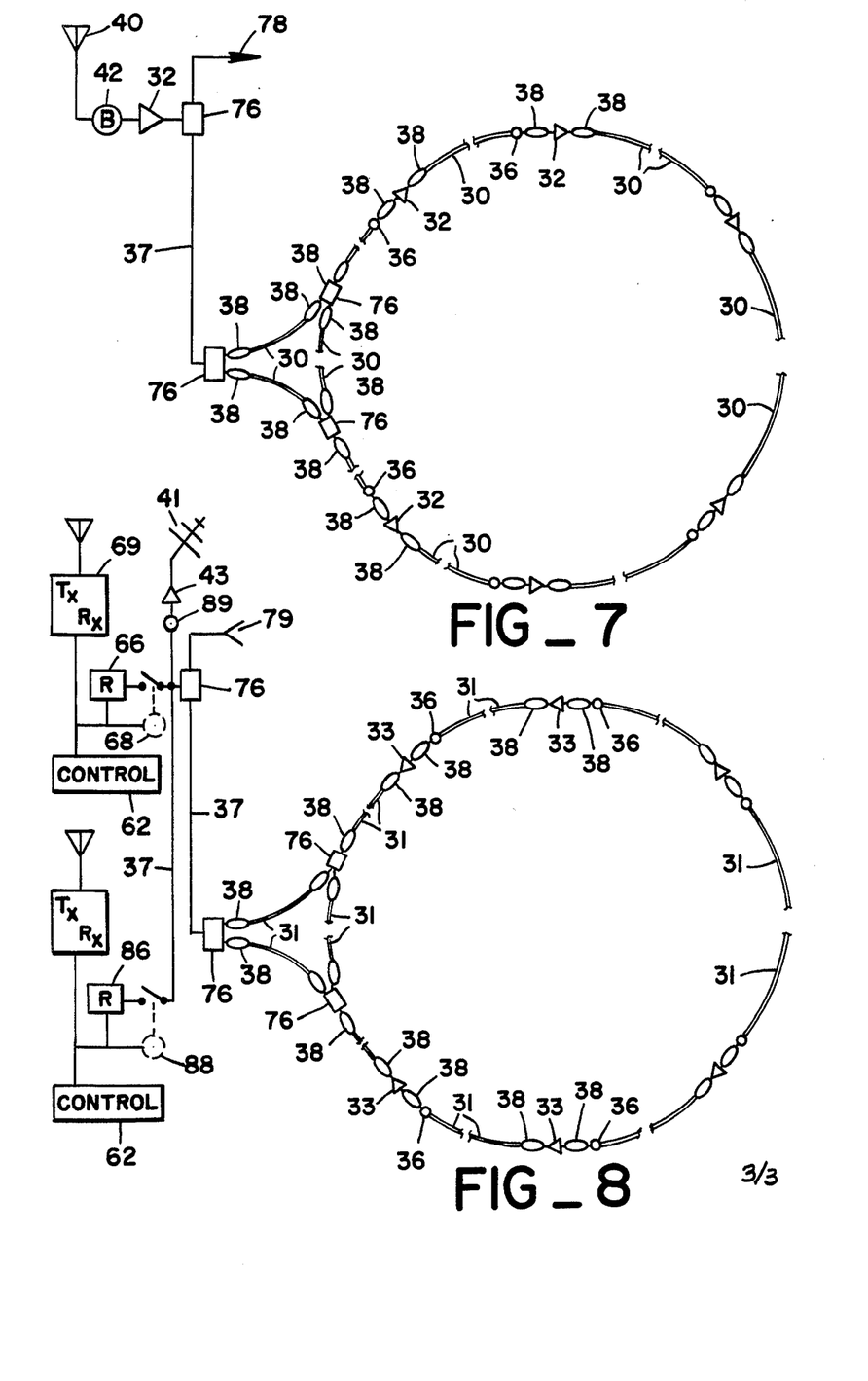
FIG. 7 is a block diagram of the ingoing loop of the radio communication system according to the preferred embodiment of this invention as proposed for installation in the tunnel of the positron-electron storage ring at Stanford linear accelerator center.
FIG. 8 is a block diagram of the outgoing loop of the radio communication system according to the preferred embodiment of this invention as proposed for installation in the tunnel of the positron-electron storage ring at Stanford Linear Accelerator Center.

Referring to FIGS. 7 and 8, block diagrams of the ingoing and outgoing portions respectively of the radio communication system according to this invention for installation in the electron-positron storage ring tunnel are shown. It will be seen that both the ingoing transmission line 30 and the outgoing transmission line 31 are split in half with each half covering one of the entrance tunnels to the storage ring tunnel as well as half of the storage ring tunnel. The division of the transmission lines 30 and 31 into two halves is easily and simply accomplished by means of commercially available coaxial line splitters which are well-known in the art. It is anticipated that the radio communication system of this invention will be extended to the beam switch yard of the Stanford linear accelerator as indicated by the arrows 78 in FIGS. 7 and 79 in FIG. 8 by installing twin lead transmission lines corresponding to 30 and 31 in the beam switch yard. It will be seen by comparison of reference numerals that the ingoing loop shown in FIG. 7 is otherwise substantially identical to the ingoing transmission line 30 as described in detail in connection with FIG. 2.

However, there is a need for more than one channel of communication into and out of the storage ring tunnel. The frequency range of 150 MHz to 170 MHz selected for the communication system will allow the system to carry six frequencies simultaneously without interference and without modification of the ingoing loop as shown in FIG. 7. However, as shown in FIG. 8, each additional channel of communication would require an additional receiver 86 and switch 88 connected to the outgoing loop 31 in parallel with the receiver 66 and switch 68 as described in connection with FIG. 6.

One of the six channels of communication could also be provided by connecting a directional antenna 41 in parallel with the receiver 66 and switch 68 through an appropriate band pass filter 89 and amplifier 43 for communication with a specific remote fixed transceiver as described in connection with FIG. 2. In the actual installation it is proposed that communication from the storage ring tunnel to a local fire department be provided through the use of such a directional antenna 41 with the band pass filter 89 tuned to the operating frequency for such fire department.

At the operating frequency range selected for the actual installation of a radio communication system according to this invention, it has been found that the twin lead used in the transmission lines exhibits an attenuation of about one and one-half dB per 100 feet in the storage ring tunnel. As pointed out above, the coupling loss between the ingoing and outgoing loops of the transmission lines having an average spacing from each other along their length of about 3 feet has been found to be about 45 dB. The coupling loss between a mobile transceiver located at any point in the tunnel and the transmission lines has been found to average about 60 dB. It will be understood that the coupling loss between the mobile transceiver and the transmission line is not critical since the power of the transmitters and the sensitivity of the receivers used may be adjusted to provide reliable communication. However, the relationship between the attenuation exhibited by the twin lead and the coupling loss between the transmission lines is critical since the gain of the amplifiers used in the transmission lines must be less than such coupling loss and yet must compensate for the attenuation exhibited by the twin lead. It is desirable for the gain of the amplifiers to be high in order to minimize the number of amplifiers required to compensate for the attenuation loss exhibited by the twin lead. On the other hand, if the gain of the amplifiers approaches the coupling loss between the transmission lines, then the system may become unstable, particularly if it is subjected to temperature variations or other environmental conditions which may result in variations in the gain of the amplifiers or in the coupling loss.

However, a thousand feet of twin lead will only exhibit an attenuation of some 15 dB thus enabling the use for each one thousand foot twin lead section of one simple and inexpensive broad band amplifier having a gain over its frequency range which need not exceed 15 to 20 dB and is thus well below the coupling loss between the transmission lines. In fact, it has been found that broad band amplifiers having a maximum gain as high as 33 dB may be used without affecting the stability of the system at least where there are no appreciable temperature fluctuations or other environmental effects.

The foregoing description of preferred embodiments of the invention has been presented for purposes of illustration and description. It is not intended to be exhaustive or to limit the invention to the precise form disclosed, and obviously many modifications and variations are possible in light of the above teaching. For example, multiplexing and other well-known radio techniques may be applied in a communication system of this invention which may also be adapted for both AM and FM operation. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A radio frequency communicating system comprising a first radiating transmission line having a proximate end and a distal end, said first transmission line including a unidirectional amplifier therein for amplifying a radio frequency signal from said proximate end to said distal end of said first transmission line, a second radiating transmission line spaced from said first transmission line having a proximate end and a distal end and substantially coextensive with said first transmission line thereby establishing a given radio frequency coupling loss between said radiating transmission lines, said second transmission line including a unidirectional amplifier therein for amplifying a radio frequency signal from said distal end to said proximate end of said second transmission line, a radio frequency transmitter coupled to at least one of said first and second transmission lines by electromagnetic wave propagation in space and a radio frequency receiver coupled to at least the other of said first and second transmission lines by electromagnetic wave propagation in space; said unidirectional amplifiers of said first and second transmission lines having a gain less than the coupling loss between said first and second transmission lines.

2. A radio frequency communication system as claimed in claim 1 wherein a plurality of said unidirectional amplifiers are included in each of said first and second transmission lines with the gain of each said unidirectional amplifier being substantially equal to the attenuation loss of the portion of said transmission line between it and the amplifier preceding it in said transmission line.

3. A radio frequency communication system as claimed in claim 2 wherein said transmitter and said receiver operate at the same given radio frequency.

4. A radio frequency communication system as claimed in claim 3 wherein said radio frequency transmitter is coupled to the proximate end of said first transmission line, said radio frequency receiver is coupled to said proximate end of said second transmission line, and a mobile transceiver operating at the same radio frequency as said transmitter and receiver is coupled to said first and second transmission lines by electromagnetic wave propagation in space intermediate said proximate and distal ends thereof.

5. A radio frequency communication system as claimed in claim 3 wherein said transmitter and said receiver comprise a transceiver coupled to said first and second transmission lines by electromagnetic wave propagation in space intermediate said proximate and distal ends thereof and a second transceiver operating at the same radio frequency as said transmitter and receiver is coupled to said first and second transmission lines by electromagnetic wave propagation in space intermediate said proximate and distal ends thereof.

6. A radio frequency communication system as claimed in claim 3 wherein a second radio frequency transmitter operating at said given radio frequency is coupled to said proximate end of said first transmission line by electromagnetic wave propagation in space and wherein a second radio frequency receiver operating at said given radio frequency is galvanically connected to the proximate end of said second transmission line.

7. A radio frequency communication system as claimed in claim 6 wherein said second radio frequency receiver is galvanically connected to said proximate end of said second transmission line through a normally closed switch, said second radio frequency transmitter is located at a remote point with respect to said first transmission line and coupled thereto by means of an omnidirectional antenna galvanically connected to the proximate end of said first transmission line and wherein said second radio frequency receiver is electrically connected to said second radio frequency transmitter through control means adapted to initiate radio frequency transmission from said second radio frequency transmitter modulated by audio frequency signals from said receiver while simultaneously opening said normally closed switch.

8. A radio frequency communication system as claimed in claim 1 wherein a first high pass filter is interposed in said first radiating transmission line at the input of said unidirectional amplifier thereof and a second high pass filter is interposed in said second radiating transmission line at the input of said unidirectional amplifier thereof.

9. A radio communication system as claimed in claim 1 wherein said first and second radiating transmission lines each comprise two lengths to twin lead transmission line with the unidirectional amplifier thereof interposed between said lengths and coupled thereto by means of impedance matching baluns at the input and output of said unidirectional amplifier.

10. A radio communication system as claimed in claim 1 wherein said first and second radiating transmission lines each comprise a length of twin lead transmission line and a length of coaxial transmission line interconnected to each other through an impedance matching balun.

11. A radio communication system as claimed in claim 10 wherein the center conductor of said length of coaxial transmission line is galvanically connected to one lead of said length of twin lead transmission line, and said impedance matching balun comprises a section of coaxial transmission line having an effective length of substantially one-half wave length at the midpoint of the operating frequency range of said system with one end of the center conductor thereof galvanically connected to the junction between said center conductor of said length of coaxial transmission line and said one lead of said length of twin lead transmission line and the other end of the center conductor thereof galvanically connected to the other lead of said twin lead transmission line, the ends of the outer conductor of said section of coaxial transmission line being galvanically connected to each other and to the end of the outer conductor of said length of coaxial transmission line at the junction between said center conductor of said length of coaxial transmission line and said one lead of said length of twin lead transmission line.

12. A radio communication system as claimed in claim 1 wherein said first and second radiating transmission lines each comprise two lengths of twin lead transmission line and a length of coaxial transmission line, said length of coaxial transmission line being connected to both lengths of twin lead transmission line through a coaxial line splitter and a pair of impedance matching baluns.

13. A radio frequency communication system as claimed in claim 9, 10 or 12 wherein said twin lead transmission line is received within an elongated pipe of dielectric material.

14. A radio frequency communication system as claimed in claim 13 wherein said dielectric material of said elongated pipe is a PVC material.

15. A radio communication system as claimed in claim 1 wherein an omnidirectional antenna is coupled to the proximate end of said first radiating transmission line through a given range band pass filter and a directional antenna facing away from said omnidirectional antenna is coupled to the proximate end of said second radiating transmission line through a band pass filter having a range within said given range.

16. The method of providing for radio frequency communication in tunnels and the like having a proximate end and a distal end comprising the steps of:
(a) extending a first radiating transmission line along said tunnel from the proximate end thereof toward the distal end thereof;
(b) extending a second radiating transmission line along said tunnel from the proximate end thereof toward the distal end thereof in spaced substantially coextensive relation to said first radiating transmission line thereby establishing a given radio frequency coupling loss between said radiating transmission lines;
(c) interposing a first unidirectional amplifier in said first radiating transmission line for amplifying a radio frequency signal in a given frequency range from said proximate end toward said distal end of said tunnel with a gain less than said given coupling loss; and
(d) interposing a second unidirectional amplifier in said second radiating transmission line for amplifying a radio frequency signal in said given frequency range from said distal end toward said proximate end of said tunnel with a gain less than said given coupling loss.

17. The method claimed in claim 16 including the steps of:
(e) interposing a first high pass filter in said first radiating transmission line at the input to said first unidirectional amplifier; and
(f) interposing a second high pass filter in said second radiating transmission line at the input to said second unidirectional amplifier.

18. The method claimed in claim 17 including the step of galvanically connecting a receiver to said second radiating transmission line at the end thereof adjacent said proximate end of said tunnel.

19. The method claimed in claim 17 including the step of connecting an omnidirectional receiving antenna located outside said tunnel to said first radiating transmission line at the end thereof adjacent said proximate end of said tunnel.

20. The method claimed in claim 19 including the step of connecting a directional transmitting antenna located outside said tunnel and facing away from said omnidirectional receiving antenna to said second radiating transmission line at the end thereof adjacent said proximate end of said tunnel.

21. The method claimed in claim 19 including the steps of galvanically connecting a receiver to said second radiating transmission line at the end thereof adjacent said proximate end of said tunnel through a normally closed switch; connecting an audio output of said receiver to a modulating input of an omnidirectional transmitter; and connecting a control means to said normally closed switch and to said omnidirectional transmitter adapted to selectively actuate said transmitter and simultaneously open said normally closed switch.

22. The method claimed in claim 19 including the step of interposing a bandpass filter having a given frequency range between said omnidirectional receiving antenna and said first radiating transmission line.

23. The method claimed in claim 22 including the step of interposing a bandpass filter having a frequency range within said given frequency range between said directional transmitting antenna and said second radiating transmission line.

24. The method of radio frequency communication comprising the steps of:
(a) amplifying radio frequency signals along a first radiating transmission line in a given direction:
(b) amplifying radio frequency signals along a second radiating transmission line spaced from and substantially coextensive with said first radiating transmission line in the direction opposite said given direction;
(c) establishing a coupling loss between said first and second radiating transmission lines;
(d) limiting the amplification of said radio frequency signals along each of said first and second radiating transmission lines to a value less than said coupling loss; and
(e) coupling radio frequency signals to and from said first and second radiating transmission lines by electromagnetic wave propagation in space.

25. The method of claim 24 including the step of filtering said radio frequency signals along said first and second transmission lines to substantially eliminate all frequencies below a given radio frequency.

* * * * *